(12) United States Patent
Thomas et al.

(10) Patent No.: US 11,386,404 B2
(45) Date of Patent: Jul. 12, 2022

(54) TEMPORARY CONSENSUS SUBNETWORK IN A DISTRIBUTED NETWORK FOR PAYMENT PROCESSING

(71) Applicant: RIPPLE LABS INC., San Francisco, CA (US)

(72) Inventors: Stefan Thomas, San Francisco, CA (US); Robert D. Way, Spring, TX (US)

(73) Assignee: RIPPLE LUXEMBOURG S.A., Luxembourg (LU)

( * ) Notice: Subject to any disclaimer, the term of this patent is extended or adjusted under 35 U.S.C. 154(b) by 983 days.

(21) Appl. No.: 14/872,450

(22) Filed: Oct. 1, 2015

(65) Prior Publication Data
US 2016/0224949 A1    Aug. 4, 2016

Related U.S. Application Data

(60) Provisional application No. 62/112,040, filed on Feb. 4, 2015.

(51) Int. Cl.
*G06Q 20/02* (2012.01)
*G06Q 20/40* (2012.01)

(52) U.S. Cl.
CPC ........... *G06Q 20/027* (2013.01); *G06Q 20/02* (2013.01); *G06Q 20/401* (2013.01)

(58) Field of Classification Search
CPC .... G06Q 30/389; G06Q 20/023; G06Q 40/00; G06F 12/1483
USPC .......................................................... 705/35
See application file for complete search history.

(56) References Cited

U.S. PATENT DOCUMENTS

| | | | | |
|---|---|---|---|---|
| 8,285,825 | B1* | 10/2012 | Nagaraj | H04L 41/04 709/203 |
| 2007/0136178 | A1* | 6/2007 | Wiseman | G06Q 30/02 705/37 |
| 2009/0138398 | A1* | 5/2009 | Cole | G06Q 20/02 705/42 |

OTHER PUBLICATIONS

'Transaction Locking and Masternode Consensus, A Mechanism for Mitigating Double Spending Attacks', Duffield, et al., 2014 (Year: 2014).*

(Continued)

*Primary Examiner* — Kirsten S Apple
(74) *Attorney, Agent, or Firm* — Butzel Long

(57) ABSTRACT

In a method, computer readable medium, or system for making a payment transaction between a payor having an associated payor computer with a ledger storage for the payor and a payee having an associated payee computer with a ledger storage for the payee in a consensus payment network having a plurality of nodes each comprising a respective computer with ledger storage and relying on consensus determinations, an initiator is provided for making the payment transaction between the payor and the payee, the initiator being either the payor, the payee, or an intermediary having an associated intermediary computer. The respective initiator computer creates a temporary payment transaction consensus subnetwork comprising a set of validation nodes acceptable to both the payor and the payee, the set of validation nodes comprising fewer than all of said plurality of nodes in the payment network. The initiator with the respective client computer processes the payment transaction via the consensus payment network from the payor to the payee based on a determination of consensus by the consensus network.

16 Claims, 5 Drawing Sheets

Payor A Computer Trusted Nodes List
- 102(a)
- 102(b)
- 102(d)
- 102(e)
- 102(f)
- 102(g)
- 102(h)
- 102(i)
- 102(j)
- 102(k)
- 102(m)

(210)

Payee B Computer Trusted Nodes List
- 102(d)
- 102(e)
- 102(f)
- 102(h)
- 102(i)
- 102(k)
- 102(l)
- 102(m)

(211)

Intermediary Computer Trusted Node List
- 102(a)
- 102(d)
- 102(e)
- 102(h)
- 102(i)
- 102(k)
- 102(m)
- 102(n)

(213)

(56) References Cited

OTHER PUBLICATIONS

'Private Intersection of Certified Sets', Camenisch et al., R. Dingledine and P. Golle (Eds.): FC 2009, LNCS 5628, pp. 108-127, 2009 (Year: 2009).*
Trust Relationships in Secure Systems—A Distributed Authentication Perspective, Yahalom, et al. 1993 (Year: 1993).*
Andrew S. Tanenbaum et al: "Distributed Systems: Principles and Paradigms (2nd Edition)", Oct. 12, 2006 (Oct. 12, 2006), Prentice Hall, XP055263689, ISBN: 978-0-13-239227—3 pages ToC,Ch01-02,Ch07-Ch09,Ch11,Ch14,Ind.
George Coulouris et al: "Distributed Systems: Concepts and Design (5th Edition)", May 7, 2011 (May 7, 2011), Addison-Wesley, US, XP055263685, ISBN: 978-0-13-214301-1 pages ToC, Pre, Ch01-Ch04, Ch12, Ch14-Ch15, Ch18, Ind.
Wikipedia: "Ripple (payment protocol)", Internet Article, Feb. 2, 2015 (Feb. 2, 2015), XP055453797, Retrieved from the Internet: URL:https://en.wikipedia.org/w/index.php?title=Ripple_(payment_protocol)&oldid=645346495 [retrieved on Feb. 23, 2018].
Pedro Franco: "Understanding Bitcoin: Cryptography, Engineering and Economics", Nov. 24, 2014 (Nov. 24, 2014), Wiley, XP055393688, ISBN: 978-1-119-01916—9 pages ToC,Ch01-Ch02,Ch05-Ch07,Ch12-Ch13.
Andreas M. Antonopoulos: "Mastering bitcoin : [unlocking digital cryptocurrencies]", Dec. 20, 2014 (Dec. 20, 2014), O'Reilly Media, Beijing Cambridge Famham Kain Sebastopol Tokyo, XP055306939, ISBN: 978-1-4493-7404-4.
Melanie Swan: "Blockchain: Blueprint for a New Economy", Feb. 8, 2015 (Feb. 8, 2015), O'Reilly, XP055279098, ISBN: 978-1-4919-2049-7.
Office Action issued in EP 16153967.1 dated March 2, 2018.

* cited by examiner

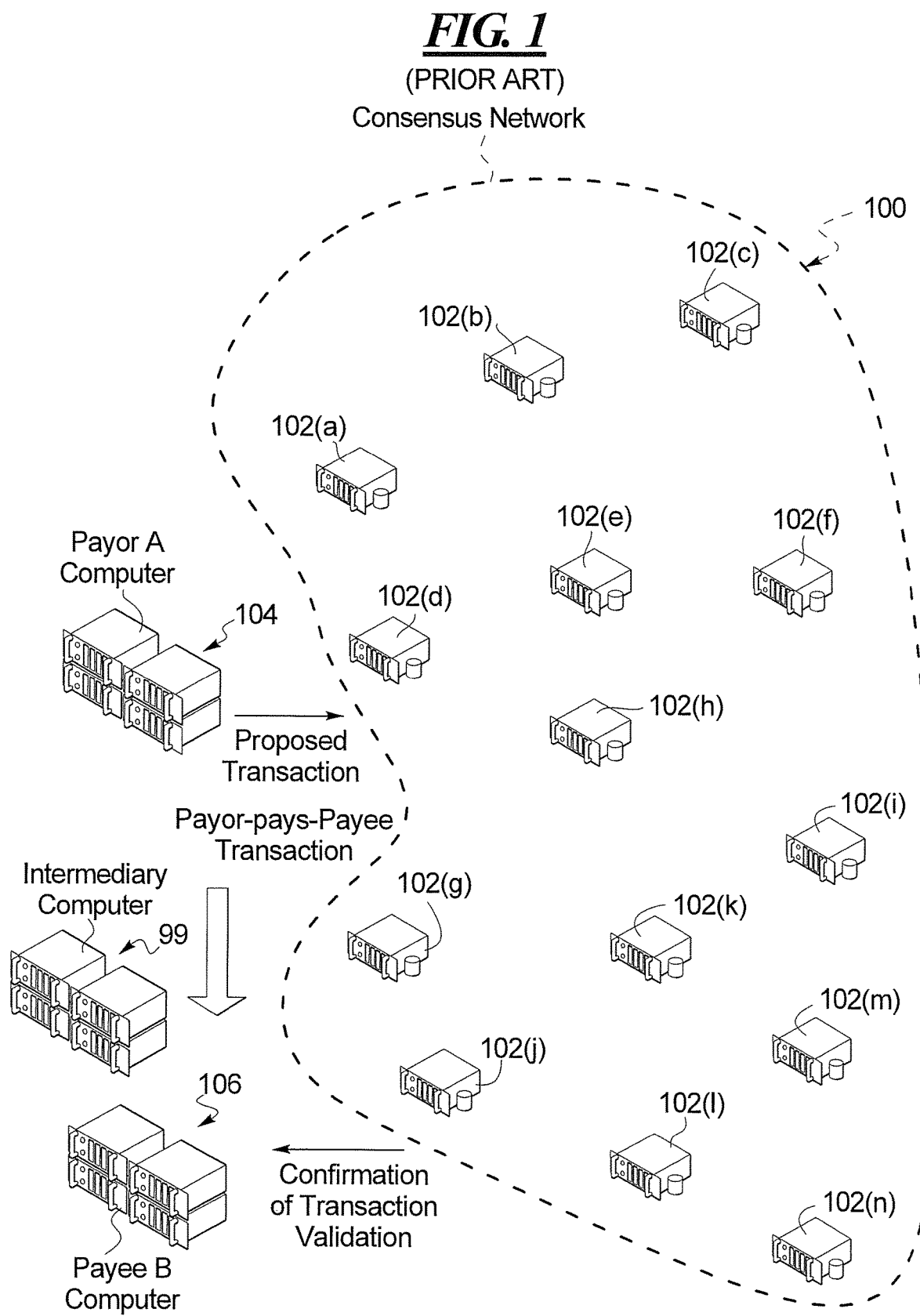

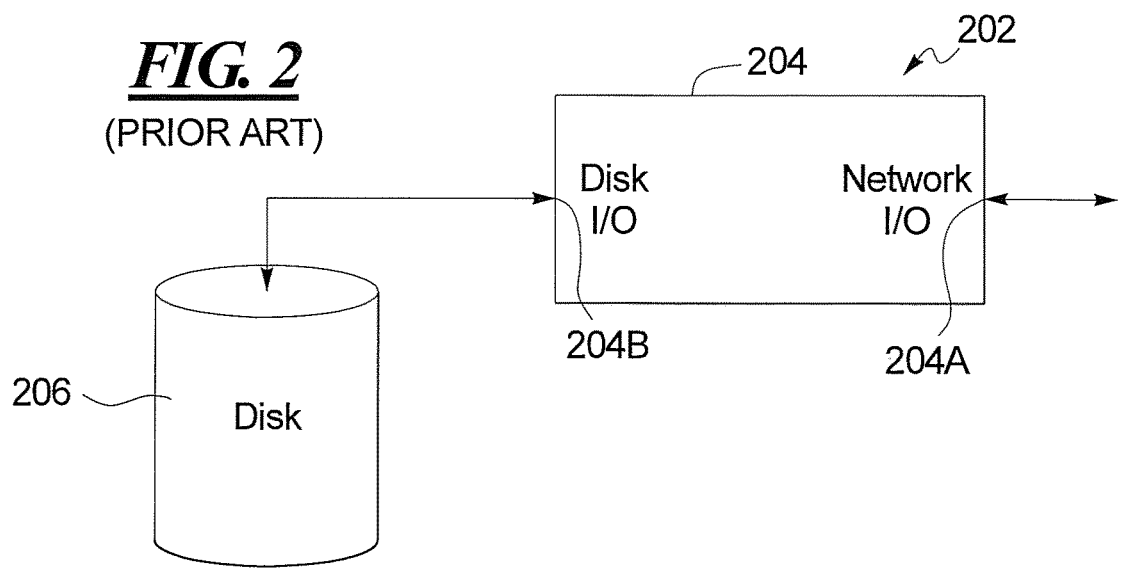

Table Showing Trusted Node Agreement List 212

| Node ID | Trust A | Trust B | Mutual |
|---------|---------|---------|--------|
| 102(a) | Yes | No | No |
| 102(b) | Yes | No | No |
| 102(c) | No | No | No |
| 102(d) | Yes | Yes | Yes |
| 102(e) | Yes | Yes | Yes |
| 102(f) | Yes | Yes | Yes |
| 102(g) | Yes | No | No |
| 102(h) | Yes | Yes | Yes |
| 102(i) | Yes | Yes | Yes |
| 102(j) | Yes | No | No |
| 102(k) | Yes | Yes | Yes |
| 102(l) | No | Yes | No |
| 102(m) | Yes | Yes | Yes |
| 102(n) | No | No | No |

Setup Procedure

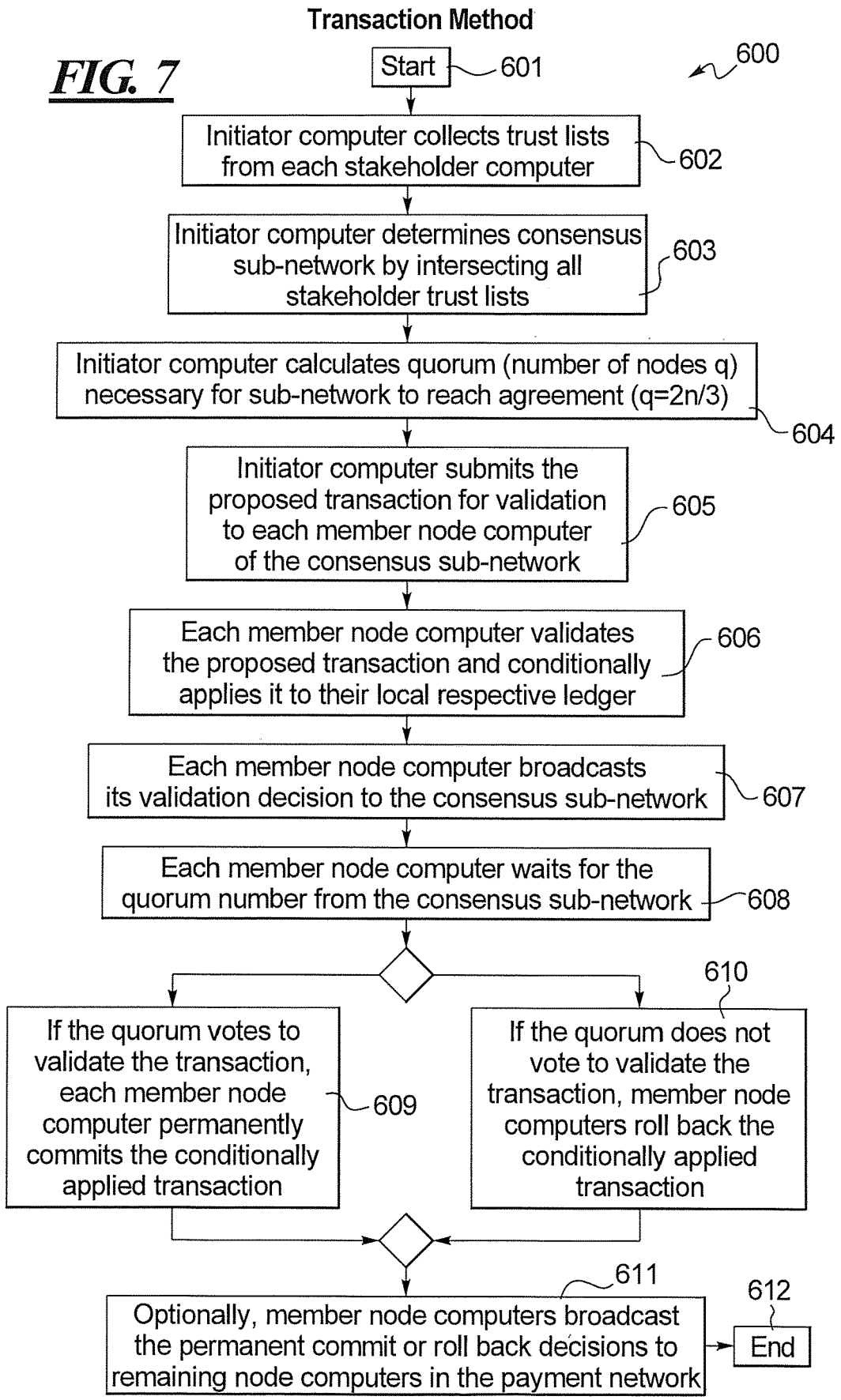

TEMPORARY CONSENSUS SUBNETWORK IN A DISTRIBUTED NETWORK FOR PAYMENT PROCESSING

RELATED APPLICATION

This application claims the benefit of provisional application 62/112,040, filed Feb. 4, 2015 titled "AD HOC CONSENSUS SUBNETWORKS FOR PAYMENT PROCESSING", incorporated herein by reference.

BACKGROUND

The present disclosure relates generally to electronic payment systems and specifically to electronic payment systems that require an element of consensus among electronic payment system nodes for assigning validity to a transaction.

Electronic payment systems have largely supplanted other methods of payment for certain types of transactions. Some electronic payment systems rely on a central authority for validity of transactions, while others rely on consensus development. Validity can mean different things in different situations and the distinctions might not matter in all cases, but typically a transaction is deemed valid when it is proven to some level of certainty that the parties to the transaction agreed to be bound by terms of the transaction that bind them and that each of those parties is able to fulfill those terms. For example, the transaction "Alice pays Bob US$100" might be considered a valid transaction if it can be proven that Alice agreed to give up US$100 and that Alice has US$100 to give up. There might also be terms binding Bob such that the transaction validity depends on proving that Bob accepts the terms, to avoid situations where money, perhaps illegitimate money, is attempted to be transferred to a party not wanting to be involved in the transaction. One way to test if Alice agreed to it would be to check the validity of Alice's signature (written or digital) on a transaction record and one way to test if Alice has the US$100 to give up is to check that Alice's account somewhere trusted has at least that amount in it and those funds have not already been allocated to another.

An example of a central authority electronic payment system is a banking payment system. Assuming both Alice and Bob are customers of Bank C and have accounts with Bank C (and by extension, trust Bank C and Bank C's computer systems), Bank C would maintain an electronic ledger of prior transactions and/or current balances for each of its customers. Bank C uses Alice's entry of a password, PIN, passphrase, or other key supposedly only known to Alice prior to typing in details of a proposed transaction as presumptive proof that Alice agreed to give up the amount stated in the proposed transaction. Bank C uses Bank C's electronic ledger to determine whether Alice has those funds available. Verifying those aspects of the transaction, Bank C's computer systems can assume the validity of the transaction and update its electronic ledger accordingly, e.g., reducing Alice's account balance by US$100 and increasing Bob's account balance by US$100.

In the case where Alice and Bob do not both have accounts at any given bank, the central authority might be one level removed from the banks. For example, Alice might initiate an electronic transaction to transfer US$100 from her account at Bank D to Bob's account at Bank E via the Automated Clearing House ("ACH"), electronic check, PayPal exchanges, or other methods known to be usable. In the case of an ACH transfer, the ACH system trusts Bank D can meet the obligation to provide US$100 in settlement and Bank D, being trustworthy and wanting to continue to use the ACH system, will secure the funds from Alice's account at Bank D before obligating itself to the ACH system. Bank D can do this because it controls Alice's account balance—Bank D would know if Alice previously spent all the money in the account. In either case, the transaction is validated by a central authority that has the power to decide whether the transaction is valid. Most bank-based systems are of this form, wherein a bank decides (or more strictly speaking, a banking computer system or program decides) whether a given transaction is valid.

Some payment systems, such as the Bitcoin payment network, rely on consensus development for validity of transactions, as there is no central authority in the Bitcoin payment network. So, if Bob wanted to sell an object to Alice for a price of 1 bitcoin, Alice might pay Bob by generating a transaction using her Bitcoin wallet software with the transaction stating "Alice transfers 1 bitcoin to Bob" and Alice signs the transaction before announcing the transaction to any Bitcoin network nodes her Bitcoin wallet software has on its list of nodes. As the Bitcoin network nodes are programmed to accept such announcements and forward those announcements to the Bitcoin network nodes they in turn are aware of or are contacted by, eventually the proposed transaction will propagate to all, most or many of the active Bitcoin network nodes that happen to be operating at the time. Since there is no central authority controlling who can operate a Bitcoin network node, anyone can join as a node. However, having no relationship with Alice, the vast majority of those nodes would not blindly trust an announced transaction supposedly from Alice.

Some Bitcoin network nodes perform "Bitcoin mining"—a process that involves listening for transaction announcements, propagating those announcements, verifying the transactions, and adding those verified transactions onto a Bitcoin ledger that is added to by consensus. In particular, a Bitcoin miner computer system will check Alice's digital signature on the transaction (ignoring the transaction if the signature does not validate), check the Bitcoin ledger to ensure that Alice's Bitcoin wallet is the current possessor of the bitcoin (e.g., that the last validated transaction involving that bitcoin was a transaction that transferred it to Alice), bundle up a number of transactions into a block and publish that block as an addition to the Bitcoin ledger.

The Bitcoin system has features that make it impractical for any minority of miner systems to just make up bogus transactions and add them to the Bitcoin ledger. One feature is that a difficult computational problem has to be solved (referred to as "proof-of-work") by the miner before its block publication would be accepted by other nodes. The solution to that difficult computational problem is a function of the transactions the miner included in the block, other contents of the block and prior blocks in the Bitcoin ledger, so if a solution is found, the miner is not able to modify the contents of the block prior to publication of the block without invalidating its own solution. Before accepting the published solution, other nodes would validate the transactions included in the block as well as verifying the publishing miner's solution. Nodes that validate the block add it to their copy of the Bitcoin ledger and since nodes propagate to other nodes these transactions and blocks, eventually the global state of the Bitcoin ledger is that all active nodes accept that the newly published block is valid and thus forms part of the shared Bitcoin ledger.

Bad actors cannot easily double-spend bitcoins, falsify transactions, or alter past transactions on the shared Bitcoin ledger because of the amount of work involved in finding these solutions to difficult computational problems and because there are so many other nodes that are each checking that the solution is valid for the block and that the transactions in the block are valid. Thus, spending the same bitcoins more than once, attempting to spend someone else's bitcoins without knowing their private key, altering older transactions, and the like would all invalidate the solution proposed by a bad actor, causing such actions to be ignored. In other words, a consensus builds that the bad actor's proposals should be ignored.

The downside is that it takes time for the difficult computational problems to be solved and for blocks to propagate and it takes considerable computing power to perform these actions throughout the Bitcoin network. This creates somewhat of a bottleneck. A new block is added to the shared Bitcoin ledger about every 10 minutes; the shared Bitcoin ledger is represented as a chain of blocks, each dependent on the prior blocks and containing one or more transactions. Until the transaction "Alice transfers the 1 bitcoin to Bob" is included into a block that is added to the shared Bitcoin ledger, Bob has little reason to assume that the transaction will go through. So, depending on the object Bob is selling, he might insist on Alice standing by for ten minutes or so before taking the object, in order to ensure that the transaction gets added to the shared Bitcoin ledger.

Another bottleneck is that blocks have a maximum size, and since only so many transactions can fit into a block, only so many transactions globally can be validated in a given time. Currently, those limits constrain a block to around 4000 transactions and with around one block being added around every ten minutes, the rate at which transactions can be processed globally is about seven transactions per second.

Yet another issue is that the proof-of-work for a block is being repeated by many, many nodes, only one of which will be compensated for the effort. Indeed, some commentators have noted that in some areas, it is possible that the cost of electricity needed to power the computation systems that perform this block mining can exceed the proceeds of the block mining.

A distributed payment consensus network has been developed and implemented as open source software and known as the Ripple® network operating according to the Ripple® protocol developed and implemented and commercially available from Ripple Labs Inc., 300 Montgomery St., Floor 12, San Francisco, Calif. 94104, and incorporated herein by reference. An illustration of this network is shown in Prior Art FIG. 1, although as previously described other types of prior art consensus payment networks exist, such as Bitcoin. Ripple® is a registered trademark of Ripple Labs Inc. The Ripple® protocol is, at its core, a shared public database. The ledger is a distributed database—a perfect, shared record of accounts, balances, and transactions in the Ripple® protocol. It is continually and automatically updated by the Ripple® Transaction Protocol (RTXP) so that an identical ledger exists on thousands of servers around the world. At any time, anybody can review the ledger and see a record of all activity on the Ripple® protocol. When changes are made to the ledger, computers connected to the Ripple® protocol will mutually agree to the changes via a process called consensus. The Ripple® protocol reaches consensus globally within seconds of a change being made. The consensus finding process is the engineering breakthrough that allows for fast, secure, and decentralized transaction settlement on the Ripple® protocol.

The distributed payment consensus network implemented as the Ripple® network comprises a plurality of what are known as network nodes with each node comprising a node computer. When setting up the distributed payment consensus network where the nodes are provided by respective providers, each provider rates remaining providers within the consensus network being created based on subjective trust and creates a respective provider trust list for the respective node computer. In the prior art Ripple® network, this set up procedure determines network wide consensus rules that are applied to every transaction without regard for the stakeholders involved in any given payment transaction. The payor, payee, and any one or more intermediaries who institute the payment transaction are what are known as stakeholders in the payment transaction if they have a stake in the payment transaction.

A new currency was created for use in the Ripple® network called XRP or "ripples". However, the network will accept any other currency, including Bitcoins.

A Ripple® a client is a computer which provides simple access to the Ripple© network. A gateway is a link between the Ripple® network and other payment networks. Gateways are needed for non XRP transactions.

SUMMARY

It is an object to provide more efficient methods of operating distributed ledgers and systems therefore.

In a method, computer readable medium, or system for making a payment transaction between a payor having an associated payor computer with a ledger storage for the payor and a payee having an associated payee computer with a ledger storage for the payee in a consensus payment network having a plurality of nodes each comprising a respective computer with ledger storage and relying on consensus determinations, an initiator is provided for making the payment transaction between the payor and the payee, the initiator being either the payor, the payee, or an intermediary having an associated intermediary computer. The respective initiator computer creates a temporary payment transaction consensus subnetwork comprising a set of validation nodes acceptable to both the payor and the payee, the set of validation nodes comprising fewer than all of said plurality of nodes in the payment network. The respective initiator computer processes the payment transaction via the consensus payment network from the payor to the payee based on a determination of consensus by the consensus network.

BRIEF DESCRIPTION OF THE DRAWINGS

Various exemplary embodiments in accordance with the present disclosure will be described with reference to the drawings.

FIG. 1 illustrates a prior art distributed payment consensus network for payment processing which is to be improved by use of a temporary consensus subnetwork as shown in FIG. 5;

FIG. 2 illustrates a prior art node of the distributed payment network of FIG. 1 in more detail;

FIG. 3 illustrates according to an exemplary embodiment of the invention a trusted nodes list for a payor A, a trusted nodes list for a payee B, and a trusted nodes list for an intermediary;

FIG. 7 shows a flow chart according to an exemplary embodiment of the invention indicating a transaction method according to at least one exemplary embodiment of a temporary consensus subnetwork in a distributed network for payment processing.

DESCRIPTION OF EXEMPLARY EMBODIMENTS

Figures 4, 6:
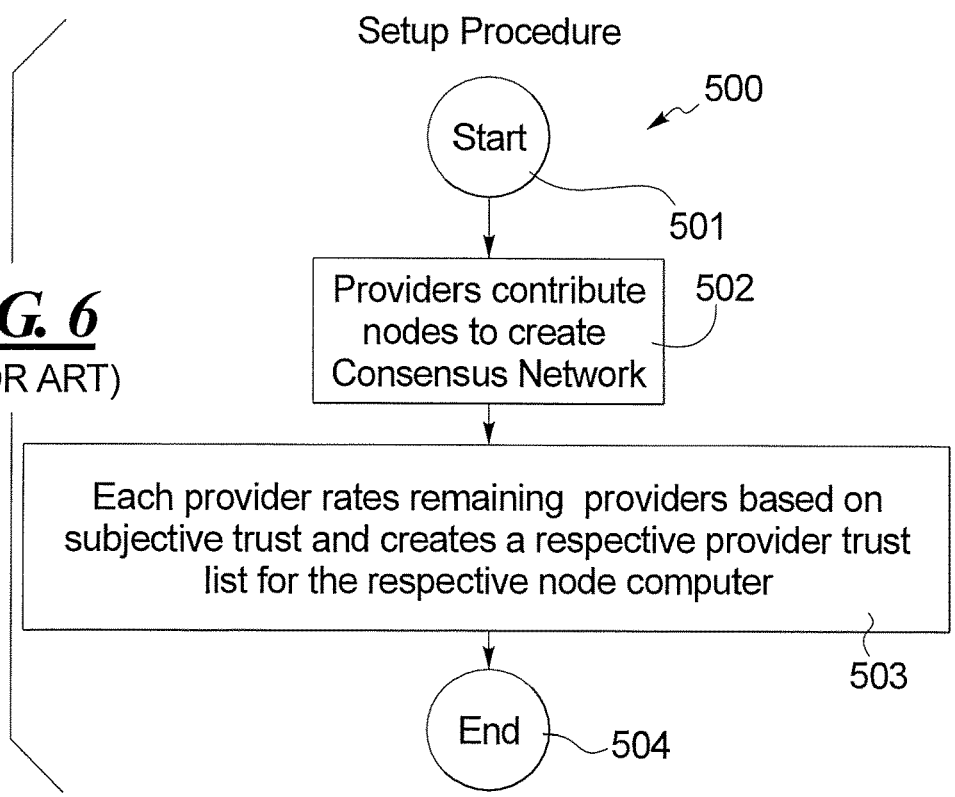
FIG. 4 illustrates according to an exemplary embodiment of the invention a consensus table illustrating mutual agreement by payor A and payee B for trusted nodes in the consensus network of FIG. 1.
FIG. 6 shows a prior art setup procedure for the prior art consensus network of FIG. 1.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the of the invention is thereby intended, and such alterations and further modifications in the illustrated embodiments and such further applications of the principles of the invention as illustrated as would normally occur to one skilled in the art to which the invention relates are included herein.

In a computer-implemented method for resolving transactions in a consensus payment network comprising a plurality of nodes and relying on consensus determinations, a payee and a payor are identified. A payor computer system having a ledger for the payor and a payee computer system having a ledger for the payee is provided. A temporary consensus subnetwork comprising a set of validation nodes is identified acceptable to the payor system and the payee system. A payment transfer (also referred to herein as a transaction) from the payor to the payee is processed based on a determination of consensus from the consensus subnetwork. As explained hereafter, one example of a consensus payment network to which the exemplary embodiment improvement may be applied is the aforementioned Ripple® network.

The logical temporary consensus subnetwork is preferably created for specific transactions and is then dissolved. Determinations of the logical consensus subnetwork can be propagated to other nodes in the payment network that are not part of the subnetwork after the transaction is complete for faster settling, while still providing network transparency.

In addition to the payor computer system and the payee computer system, one or more intermediary computer systems having ledgers may be interposed, such as when neither the payor and payee computer systems have ledgers for both the payor and the payee. In such cases, the logical consensus subnetwork may comprise a set of validation nodes that is also acceptable to the one or more intermediary computer systems.

In the exemplary embodiments described hereafter it is generally assumed that a transaction involves a payment from a payor to a payee such that an asset or obligation is transferred between the parties by balancing alterations in one or more electronic ledgers. A transaction can be as simple as one payor making a payment to one payee denominated in a currency that both the payor and the payee deal in and subject to a single jurisdiction. A transaction can be more complex and might involve multiple payors, multiple payees, an intermediary that converts currency and intermediaries that span jurisdictions. An intermediary that spans jurisdictions is useful where the payor is subject to one set of financial laws or rules and the payee is subject to a different set of financial laws or rules. By spanning jurisdictions, the intermediary will comply with both sets of laws or rules. The exemplary embodiments herein will be typically described with reference to the simple transaction but are not limited to the simple transaction. In some cases, the complex transaction can be split into multiple single hop transactions that have the added requirement that all of the multiple single hop transactions have to settle or none of them settle.

For example, suppose a U.S. bank account holder (say, a U.S. importing business) wants to make a payment to an EU bank account holder (say, a German exporting business). If the U.S. bank does not have an EU banking license, which is typical of most small and mid-sized banks, then the U.S. bank first transfers the funds to a large U.S. bank, its domestic correspondent bank. However, given that these banks operate different core account ledgers, they are unable to transact directly. Thus, the U.S. bank routes the funds through the Federal Reserve, which then relays the funds to the domestic correspondent bank. These funds are transferred via the ACH system. The correspondent bank maintains an account in the EU banking system, known as a nostro account, which is pre-funded with euros. After receiving USD funds via ACH, the domestic correspondent bank then initiates an offsetting EUR transfer from its nostro account to the beneficiary's bank in the EU banking system. Again, given that these EU banks also operate different account ledgers, the EU correspondent bank needs to route the funds via the European Central Bank, which acts as a clearing agent and finally relays the funds to the European bank where the German exporting business has an account.

International transactions typically need to go through a series of hops between domestic banks, central banks and correspondent banks. Each hop represents an additional layer of cost (usually a per transaction fee), risk (settlement and counterparty risk), and delay. Additionally, international transactions introduce FX conversion fees (for businesses/consumers) and currency reserve management costs (for banks). The path for transactions between two developing market regions can be even more complex and costly, and in some cases, non-existent.

As a way of avoiding these costs, some transactions are handled by a distributed ledger system. A distributed ledger system enables peer-to-peer transaction settlement and thus circumvents the complicated and costly correspondent banking framework, although banks and other financial institutions can still be part of a distributed ledger system. In a distributed ledger system, nodes of a network maintain a copy of the distributed ledger. Changes to the distributed ledger, representing transactions that apply to the ledger, are made once the network reaches a consensus that the transactions are complete.

With a distributed ledger system, each node may not need to be trusted by other nodes, as long as there is a mechanism to prevent nodes from easily making changes to the distributed ledger that are in fact not completed or completable transactions. For example, by having a rule that a considerable amount of computation is required (and proof of that work is required) before changes would be accepted as official changes to the distributed ledger, even untrustworthy nodes would not likely be employed to push out invalid transactions (such as ones not in fact authorized by the stated payor or not represented by assets actually controlled by the payor). One reason is that the untrustworthy node would perform all of the computation needed and its proposed change would just be ignored by other nodes and no consensus would build in order to add the proposed change to the distributed ledger. Since the operator of the node could expect no benefit from doing the work, it would not likely have the node do that work and even if it did, it would not matter to the rest of the network.

In some distributed ledger systems, there are nodes that perform work related to validating transactions that are not of interest to the operator of that node. This is the case with the Bitcoin network. An individual, a business, or an institution might be running a Bitcoin node, perhaps in the form of specialized hardware or a programmed general purpose computing system with network connectivity that sends and receives Bitcoin protocol messages. Some of those messages relate to proposed transactions and are propagated from node to node. Some of the nodes will "mine" transactions, i.e., collect pending transactions into a block and attempt to perform a complex computation task tied to the data of that block. One of the nodes will arrive at a solution to the complex computation task and propagate that to other nodes. Other nodes might also have been working on that complex computation task or a similar one, but since only one node can win, there is considerable computation going on that does not benefit the operator of the node performing that computation, nor is it of benefit to particular transaction parties or the network in general.

In part, this is by design in the Bitcoin network. If a transaction were not widely disseminated, it might only be seen by a few nodes that are configured to subvert the network. If adding a block to the distributed ledger was simple, then an untrustworthy node could flood the network with bogus transactions. Therefore, work and proof-of-work are needed there. In effect, many nodes participate in doing the distributed validation not because those nodes are involved in the underlying transactions, but to keep other nodes honest.

One downside of this approach is that double-spending is not immediately caught, even though it might eventually be caught. For example, suppose Alice has an account balance of $US300, spends US$300 in a transaction sending those funds to Bob and then immediately spends US$300 in a transaction sending those funds to Charlie. In a Bitcoin network, it is possible to put forth both transactions. One way Alice could do that is to engineer the network so that the two signed transactions propagate over distinct paths and no nodes encounter both transactions. If Alice can maintain that state, each node that encounters one or the other of the transactions would consider them valid, since Alice signed them and there are funds to cover that one transaction. Fortunately, as the Bitcoin network operates by propagation and consensus, eventually some nodes will see both transactions, and then more nodes will see both transactions and the network would come to the consensus that both of the transactions are not valid. With the Bitcoin network, this clearing process takes around 8 to 12 minutes. While that is not necessarily a problem, it could be. If Alice's payment to Bob was payment on an invoice for goods sent, Bob is no worse off ten minutes after the transaction, as he can just decline to credit Alice's balance owing to Bob. However, if Charlie is a grocer and the transaction was for the payment of groceries provided to Alice, if the transaction is deemed invalid ten minutes after the purchase, Alice and the groceries are likely irretrievable. If a transaction is for online or in-app goods, such as the purchase of a special sword in a multi-player game, it may well be that Alice can purchase the sword and use it to great advantage over other players all while the purchase transaction is pending and before the consensus is reached that the transaction is not valid (or the transaction disappears for lack of validation).

To avoid such problems a temporary transaction specific validation consensus subnetwork is used in the present exemplary embodiments that uses less than all of the available nodes in the distributed payment network in building a consensus as to the validity of transactions.

An example of a distributed payment consensus network is the aforementioned Ripple® network.

FIG. 1 illustrates a prior art distributed payment consensus network 100 such as the previously described Ripple© network for payment processing. Of course as previously described other types of consensus payment networks are known, such as Bitcoin. Each node 102a-n of network 100 is a computer, computing system, or computing device, possibly virtualized, possibly implemented using specialized hardware, capable of sending messages to other nodes, receiving messages from other nodes, performing computations, and storing data. In FIG. 1 these computers are depicted as servers although they may not be. The exact details of the elements of nodes 102a-n need not be described, as conventional hardware or its equivalent can be used. In addition to nodes 102a-n it should be understood that other nodes not illustrated may also exist. The nodes not shown in FIG. 1 can be ignored.

Also shown in FIG. 1 are payor A computer 104 for payor A and payee B computer 106 for payee B. Those are intended to be general in this example. They have been illustrated to be a server, such as at a bank, which is connected to a client computer such as a desktop where the payor or payee may have interaction when making the payment or receiving the payment. The payor A or payee B computer may be any kind of computer, however. An initiator of a payment transaction between the payor A and the payee B may be either the payor A with payor computer 104, the payee B with payee computer 106, or an intermediary with an intermediary computer 99 (also shown as a server but can be any computer). One or more of the intermediary computers 99 may be provided. Intermediary computers may also be referred to as connectors. The intermediary may be an individual, a company, a credit card company, a clearing house, a market maker, an exchange, a foreign exchange, etc. The payor, payee, the one or more intermediaries, and one or more network nodes if they are also a payor, a payee or an intermediary are what are known as stakeholders in the payment transaction if they have a stake in the payment transaction. Each computer 104, 106, or 99 if applicable, can be implemented using a computer, computing system, or computing device, possibly virtualized, possibly implemented using specialized hardware, that is operated and controlled by an individual, a group, a business, an entity, etc. that is referred to herein generally as the "provider". Similarly, providers also supply and operate network nodes 102a-n with respective node computers. Some providers may operate more than one computer and/or more than one node. In some configurations, a stakeholder's computer might also be a node.

Although only one payor and one payee are shown, multiple payors and/or multiple payees may be provided. Thus a payment can be made from one payor to one payee, from one payor to one payee via one intermediary, from one payor to one payee via multiple intermediaries, and from multiple payors to multiple payees via multiple intermediaries.

It is assumed that each node is connected to a network in some way such that it can send and receive messages to and from other nodes. For clarity, the possible network connections between nodes are omitted in FIG. 1, but can be assumed.

FIG. 2 illustrates one prior art node in more detail. There, a node 202 is shown having a computing portion 204 with a network I/O interface 204A and a disk I/O interface 204B connected to a disc storage 206 with a stored distributed ledger for the respective node. Computing portion 204 may be software and/or a processor, memory, logic and other elements typically used for computing. In FIG. 1 the nodes have been shown as servers, but may be other types of computers. The network I/O interface allows computing portion 204 to send and receive messages over a network, such as messages to and from other nodes. The disk I/O interface allows computing portion 204 to read and modify information such as a ledger in disc storage 206. Other memory and storage, not shown, may be employed.

The ledger can be in the form of a summary of past transactions, details of all past transactions, or some other data structure that would allow a node to determine a balance and/or account history as desired. Part of the computation that node 202 does is to receive changes to the ledger, decide whether to accept those changes, and send out its own changes.

A transaction may have an online part and an offline part, but that should not matter to how the online portion of the transaction occurs. An example would be a transaction of buying a car for an agreed amount of money, such as "Bob agrees to pay Charlie X units of currency C as consideration for Charlie agreeing to transfer title of an automobile to Bob". For the purposes of this example, assume that there is some mechanism that Bob uses on the side to ensure that Charlie gives the automobile to Bob. This can often involve the reputation of Charlie as a business person, but however it is accomplished, assume that the transaction that the payment network has to deal with is Bob paying Charlie X units of currency C. More specifically, the transaction would be a recordation of Bob transferring X units of currency C to Charlie with proof that Bob authorized the transfer and a mechanism to prevent Bob from failing to transfer (e.g., by spending those funds elsewhere or not having the funds) and to prevent Charlie from losing the benefit of the transfer.

In a centrally controlled payment system, those mechanisms involve balance checking, use of credit instruments, placing holds on accounts and the like. In a distributed ledger system, those mechanisms involve sufficient nodes reaching a consensus that Bob has the funds, the funds cannot be double-spent, that Bob agrees to the transaction, so that Charlie is able to be compensated for the transfer. "Sufficient" nodes may be the number of nodes needed to overpower any untrusted nodes working alone or together that would allow an invalid transaction to proceed. In the case of distributed payment network 100, referring back to FIG. 1, if all fourteen nodes 102(a)-102(n) agreed that Bob authorized the transaction and Bob is able to provide, and has provided, the assets to be transferred, the transaction could be considered valid.

If all fourteen nodes are operated by one entity and that entity is trusted, then payor A computer 104 and payee B computer 106 can trust that the transaction is valid, but then that is effectively a centrally controlled payment system distributed over hardware. Instead, consider the case where not all nodes 102 are trusted. Some nodes might be provided by unknown parties with unknown reputations. Other nodes might be provided by trusted parties, such as a central bank of a stable nation state, a banking institution with a reputation more valuable than any transactions it could possibly forge, or nodes trusted for other reasons.

Some nodes might be trusted by some nodes but untrusted by other nodes. For example, a U.S. company using the distributed payment network to make a salary payment to a programmer in Germany might trust nodes associated with payment processors operating in the U.S., but those nodes might not be trusted by the programmer in Germany (or the financial institutions actually performing the transactions for their customers).

One possible exemplary embodiment of the invention will now be described beginning with FIG. 3.

FIG. 3 provides an example of trust ratings in a trust list 210 for payor computer A and a trust list 211 for payee computer B to be used as an improvement in the prior art distributed payment network 100 of FIG. 1. As described hereafter in more detail these trust lists 210 and 211 for payor and payee are set up for each individual transaction and only a relatively smaller number of nodes of the consensus network need to participate in the individual transaction as described in greater detail hereafter. In this example, the trusted nodes for each payor and payee computer are shown. It should be understood that when a payor A makes a payment he uses a payor computer at his bank, for example, which determines the exemplary trust list on behalf of the payor. The same is true for the payee and the payee's bank computer which determines the trust list on behalf of the payee.

In the prior art Ripple® network, for the purposes of validating an individual transaction, stakeholder computers agree to only accept transactions that are validated at all fourteen nodes, but this is not necessary (and can be impractical with an actual number of nodes found in a distributed payment network). Instead, according to an exemplary embodiment of the invention, to allow for possibly near real-time clearing and more efficient processing, stakeholder computers agree to accept transactions that are validated using a temporary subnetwork as explained hereafter using less than all fourteen nodes.

If a stakeholder computer is one of the nodes of the consensus network shown in FIG. 1 then it already has its trust nodes list created as part of the setup described in FIG. 6 hereafter. However, if it is not one of the nodes of the consensus network 100, then, in addition to the trust node lists set up for the payor and payee, according to the exemplary embodiment of the invention a trust nodes list is also setup as shown at 213 in FIG. 3 for the intermediary computer.

Figure 5:
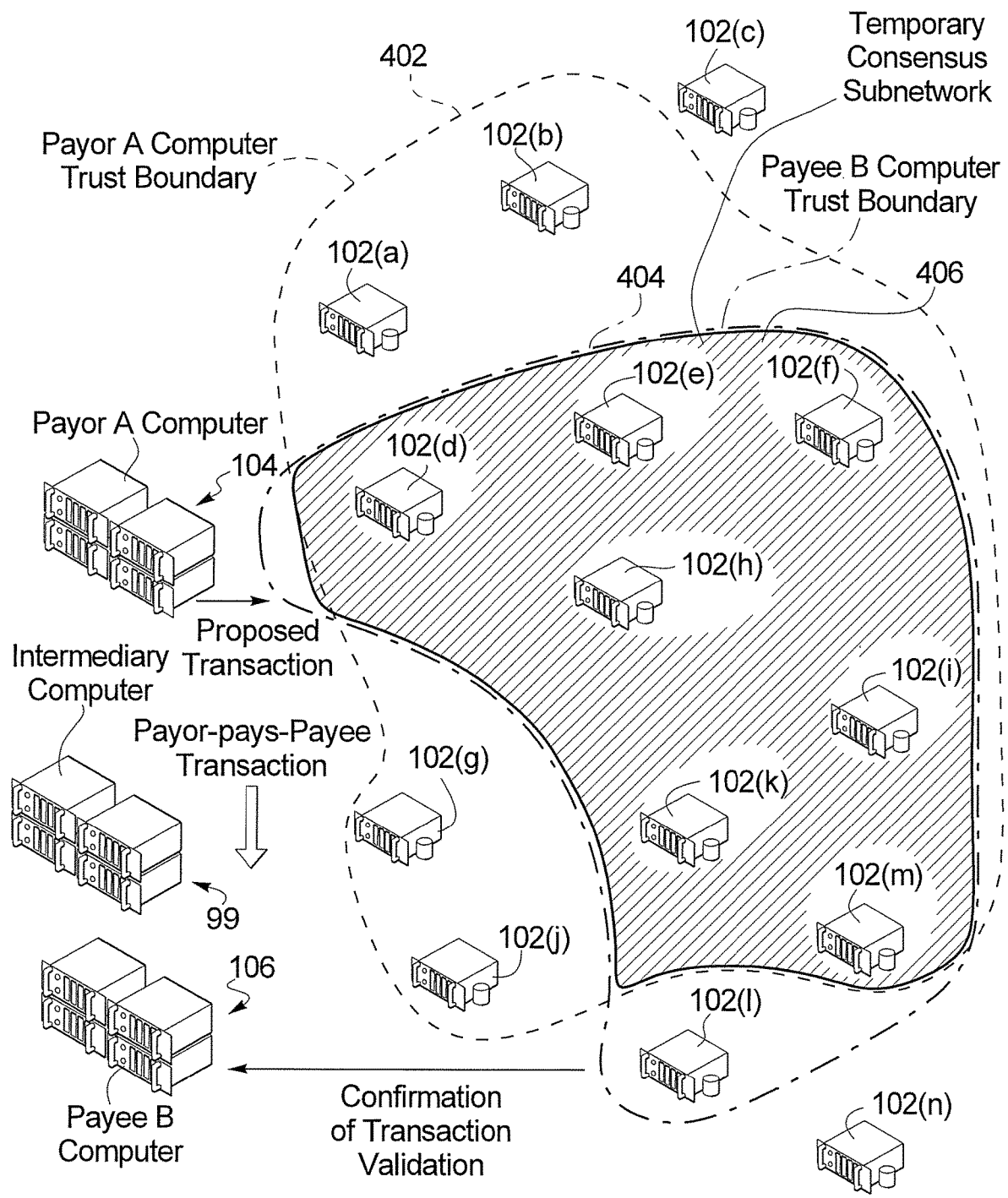
FIG. 5 illustrates according to an exemplary embodiment of the invention a payor A computer trust boundary, a payee B computer trust boundary, and a temporary consensus subnetwork illustrating nodes where payor A and payee B have trusted node agreement.

As illustrated by the table 212 showing a trusted node agreement list in the "Mutual" column in FIG. 4, there is mutual agreement by payor computer A and payee computer B for nodes 102(d), 102(e), 102(f), 102(h), 102(i), 102(k), and 102(m). Intermediary computer 99 may also establish the mutual agreement. This mutual agreement for trusted nodes thus defines a temporary consensus subnetwork 406 which is illustrated in FIG. 5 by cross-hatching, and which represents an overlap between a payor A computer trust boundary 402 shown by larger dashed lines and a payee B computer trust boundary 404 shown by smaller dashed lines. This subnetwork 406 is surrounded by a solid line. Computer A then sends proposed transaction information for the payment transaction to the temporary consensus subnetwork 406 and computer B as payee receives confirmation of transaction validation from the same temporary consensus subnetwork 406.

It may be that nodes are weighted by their computing power and different nodes might have different computing power, but for simplicity of explanation, assume each node has roughly the same power. Payor A computer 104 is willing to trust the subnetwork 406 because it trusts a supermajority of the nodes and payee B computer 106 is willing to trust the subnetwork because it also trusts a supermajority of the nodes, albeit a different supermajority.

In some instances, trust might be proxied by some protocol that prevents the breaking of trust, such as a requirement that nodes provide proof-of-work that precludes them from swamping the network with bogus transactions. For example, neither the payor or the payee computer trusts node 102(c) or node 102(m) but still can work with node 102(c) or 102(m) since that node is not powerful enough to flood the network with sufficient proof-of-work the generate consensus on a bogus transaction if the other nodes are disagreeing and also performing work.

Nodes not involved do not necessarily have to trust anything said by subnetwork 406, as it may be that the providers of those nodes do not care about transactions between payor A computer and payee B computer that do not involve those operators. Thus, they can accept the transactions at face value with no harm to those operators. There might be some harm if some subnetwork is spewing out transactions in an attempt to swamp the rest of the payment network, but that can be dealt with in other manners.

In some cases, for some transactions two computers may mutually agree to a single node that they both trust and that node would perform the validation of the transaction, so consensus building is not needed. This might occur where a trusted escrow company goes into business to provide transaction validation services. In that situation, nothing really needs to change relative to the larger subnetwork system, but the computers may reach agreement faster than if they have to negotiate to find an agreeable set of nodes.

One or more of the nodes might be market maker nodes, wherein the market maker serves as an intermediary to bridge portions of a transaction. For example, if the payor wanted to make a payment in currency C1 and the payee wanted to be paid in currency C2, the transaction might have two legs with an intermediary market maker node signaling that in exchange for receiving the payor's funds in currency C1 the intermediary market maker agrees to pay the payee in currency C2, with perhaps some market maker markup. Presumably the intermediary market maker has consensus itself to only enter into contracts it agrees to enter, so as long as a consensus is formed that the transaction is valid as to the payor, the payee and the market maker, the entire transaction can be considered validated.

Consider the case where, due to network propagation delays or the like, nodes do not all get notice of transactions that occur over the consensus subnetwork for some time. As an example, suppose that a non-participating node does not get notice of a transaction between one node and another node until 30 minutes after the transaction is initiated and at that time, the non-participating node performs calculations that determine that the payor's digital signature on the transaction was not actually the payor's digital signature. In order to cover such situations, the payment network might have a rule that no transaction is validated and final until all of the known nodes report a decision or at least 35 minutes pass. In many instances, such a time lag for clearing a transaction is unacceptable.

In the example described above, suppose that the consensus subnetwork came to a consensus that a transaction is valid in a few seconds or less and the parties to the transaction continued in their business assuming the transaction went forward and will not roll back. If later, non-participating node disagrees with the validity of the transaction 30 minutes after the transaction began and nearly 30 minutes since the consensus subnetwork came to a consensus, that disagreement can be ignored, since the parties involved agreed to a particular consensus subnetwork.

Depending on the transaction, an involved party might apply constraints on its agreement to a particular consensus subnetwork. For example, if a transaction is for the price of a candy bar, a merchant bank providing a payee B computer that accepts payments for a candy seller might have a rule that so long as three trusted nodes and in the consensus subnetwork and at least 20 apparently independent nodes are used, the merchant bank will agree to make the merchant whole if something later goes wrong. However, if a transaction is for a truckload of precious metals or a large number of shares of stock, a merchant bank operating a payee B computer that accepts payments for the seller of those assets might require a minimum of five trusted nodes known to be independent of each other and a minimum of 100 nodes, at least half of which are selected using a method not controlled or controllable by the payor or payor's computer. In some cases, the nodes used might be very interested in a particular transaction, such as where the nodes are operated by providers that provide offline guarantees of transactions.

As an example, the nodes with their node computers may be a consensus payment system network. Consensus may entail a supermajority of bridge network server computers mutually agreeing that a transaction within the network is valid, with the ledger being updated only when a given node determines that consensus has been reached. Note that consensus need not be unanimous. Cryptography can be used to verify whether transactions are valid or not.

A temporary consensus subnetwork may exist for multiple transactions, for a set period of time, for a single transaction (transaction specific), or some other variant. For example, a temporary consensus subnetwork may be quickly formed for each transaction. Presumably, the temporary consensus subnetwork has the trust of the parties to the transaction as explained above.

Steps of the inventive temporary consensus subnetwork in a distributed network for a payment processing will now be described with respect to the flowcharts in shown in FIGS. 6 and 7.

FIG. 6 is prior art and illustrates for the Ripple® a network generally at 500 a flowchart for a setup procedure. After start 501 providers of nodes for the prior art consensus network 100 shown in FIG. 1 construct or have already constructed a consensus distributed network for payment processing for payors and payees. Thus the providers contribute the nodes to create the prior art consensus network 100. Payor A computer 104, payee B computer 106, and/or intermediary computer 99 in FIG. 1 provide access to the consensus network 100 for the proposed payor-pays-payee transaction. Thereafter, in step 503 each provider rates remaining providers based on subjective trust and creates a respective provider trust list for the respective node computer. This setup procedure then concludes as shown at end step 504.

If the intermediary computer 99 is one of the nodes of the consensus network 100 shown in FIG. 1, then the trust list for that intermediary computer is created in the setup procedure as just described above. However, if the intermediary computer is not one of the nodes of the consensus network then its trust nodes list is created as previously described and referenced as the intermediary computer trust nodes list 213 shown in FIG. 3.

Referring now to FIG. 7, the transaction method for an individual transaction according to one exemplary embodiment of the invention after the setup previously described in FIG. 6 is illustrated generally at 600.

After start 601, at 602 for an individual payment transaction initiated by an initiator, the initiator computer collects trust lists from the payor computer, the payee computer, and any other intermediary computers and network node computers if they are also a payor, a payee, or an intermediary computer which hold a stake in the individual payment transaction (the "stakeholder" computers). These should be the trust lists for payor and payee computers shown in FIG. 3, for example, and similarly created trust lists for the other stakeholder computers.

At step 603 the initiator then calculates the intersection of the collected trust lists as previously described in relation to FIG. 4. The intersecting nodes become consensus subnetwork members.

In step 604, where n is the number of member nodes in the consensus subnetwork, the initiator calculates the necessary decision quorum as $q=2n/3$—that is the number of nodes necessary to reach agreement.

At step 605, the initiator submits the proposed payment transaction for validation to each member node computer of the consensus subnetwork. As part of this process, the initiator also submits a messaging timeout, a list of the other subnetwork members, and the quorum as computed in steps 603 and 604.

At step 606, upon receiving the proposed transaction from the initiator computer, each member node computer checks that the transaction meets the validating rules of the ledger they operate. This may include checking to make sure the payor has sufficient funds to make the transaction. It also may include checking each intermediary step in the transaction. If the transaction appears valid, it is conditionally applied to the local ledger. This conditional application assures that the validation conditions cannot change prior to reaching a final validation consensus.

At step 607, each validating member computer broadcasts a verifiable copy of its decision to every other member of the consensus subnetwork. Decision messages should be verifiable in order to prevent forged broadcasts. Verification is through public key cryptography or HMAC or other mechanism cryptographic.

At step 608, each member listens for validation decisions from the other member computers of the consensus subnetwork. Member computers continue waiting until either it has received a quorum of verified decisions or the timeout (supplied at step 605) expires.

At step 609, if a quorum of member computers decide to validate the transaction, then all member computers permanently commit the transaction to their local ledger.

At step 610, if a quorum of member computers decide a transaction is invalid or a decision quorum is not achieved within the specified time period, all member computers rollback the conditionally applied changes, thus restoring pre-transaction balances.

Optionally, depending on the payment network implemented, at step 611 validating nodes may broadcast transactions and validation decisions to other node computers in the payment network so their local ledgers can be updated. This may include propagating only validated transactions or propagating all decisions, thus enabling a common record.

The method is then ended at step 612.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method for validating a payment transaction between a payor and a payee using a consensus payment network comprising plurality of node computers comprising a distributed ledger, the method comprising:

providing the payor with a payor computer comprising a portion of the distributed ledger;

providing the payee with a payee computer comprising a portion of the distributed ledger;

providing an intermediary with an intermediary computer;

performing, by either the payor or the payee computer or the intermediary computer, steps of:

collecting at least a first trust list and a second trust list;

intersecting a plurality of trust lists including at least the collected first and second trust lists, by a step of determining ones of the plurality of node computers that appear on each of the plurality of trust lists; the determined node computers defining trusted node computers;

defining a temporary payment transaction consensus subnetwork comprising a number of the trusted node computers equal to or greater than a number specified as defining consensus for the consensus subnetwork;

validating by each of the trusted node computers the payment transaction;

providing by the temporary payment transaction consensus subnetwork a validation consensus;

processing, by the payor or payee computer, the payment transaction based on the validation consensus.

2. The method of claim 1 wherein the intermediary computer comprises a computer of at least one of an individual, a company, a credit card company, a clearing house, a market maker, an exchange, and a foreign exchange.

3. The method of claim 1 wherein: the intermediary computer is acceptable to both the payor and the payee.

4. The method of claim 1 wherein only one payor and only one payee are provided but a plurality of intermediaries are provided for validating the payment transaction between the payor and the payee.

5. The method of claim 1 wherein a plurality of payors are provided.

6. The method of claim 1 wherein a plurality of payees are provided.

7. The method of claim 1 wherein providers contribute said plurality of nodes to create said consensus payment network, and each of the providers rates remaining providers based on subjective trust and creates a respective provider trust list for one or more computers of the plurality of computers, the one or more computers comprising a node of the plurality of nodes.

8. The method of claim 7 further comprising steps of: submitting by the payor or payee computer the payment transaction for validation to each of the trusted node computers that comprise the temporary payment transaction consensus subnetwork.

9. The method of claim 8 further comprising steps of:

validating by each trusted node computer that comprises the temporary payment transaction consensus subnetwork, the payment transaction and conditionally applying be each trusted node computer, the payment transaction to the distributed ledger.

10. The method of claim 9 further comprising the steps of:

broadcasting by each of the trusted node computers comprising the temporary payment transaction consensus subnetwork a respective corresponding validation decision to the temporary payment transaction consensus subnetwork.

11. The method of claim 10 wherein the method further comprises the following steps:

receiving by each of the trusted node computers that comprise the temporary payment transaction consensus subnetwork each of the respective corresponding broadcast validation decisions;

committing the payment transaction to the distributed ledger in accordance with a consensus of the broadcast validation decisions, wherein a consensus is defined as a specified number of identical broadcast validation decisions having been received.

12. The method of claim 11 further comprising the steps of:

broadcasting by each of the computers the comprise the temporary payment transaction consensus subnetwork the validation decisions to at least one of the plurality of node computers comprising in the consensus payment network that is not one of the trusted node computers that comprise the temporary payment transaction consensus subnetwork.

13. The method of claim 1 wherein the step of defining the temporary payment transaction consensus subnetwork is carried out by performing steps of:

receiving by the payor or payee computer, a payor node list of node computers acceptable to the payor, receiving by the payor or payee computer, a payee node list of computers acceptable to the payee, and determining a consensus node list by performing a step of identifying trusted node computers comprising the temporary payment transaction consensus subnetwork which also comprise said consensus node list.

14. The method of claim 1 further comprising steps of:

processing, by transaction computers, the payment transaction;

upon completion of processing the payment transaction, broadcasting by each trusted node computer comprising the temporary payment transaction consensus subnetwork, distributed ledger changes to at least one of the plurality of node computers comprising the consensus payment network that is not also one of the trusted node computers that comprises the temporary payment transaction consensus subnetwork.

15. The method of claim 13 further comprising a step of:

completing by the transaction computers, the processing of the payment transaction;

deleting, by the payor or the payee computer, the consensus node list.

16. The method of claim 1 wherein the temporary payment consensus subnetwork is transaction specific and is no longer used after said payment transaction.

* * * * *